F. S. CARR.
ATTACHING MEANS FOR FASTENING MEMBERS.
APPLICATION FILED JAN. 10, 1908.

959,308.                                    Patented May 24, 1910.

Witnesses:
P. H. Pezzetti
E. Batchelder

Inventor:
F. S. Carr
by Wright Brown Quimby May
attys.

UNITED STATES PATENT OFFICE.

FRED S. CARR, OF BROOKLINE, MASSACHUSETTS, ASSIGNOR TO CARR FASTENER COMPANY, OF BOSTON, MASSACHUSETTS, A CORPORATION OF MAINE.

ATTACHING MEANS FOR FASTENING MEMBERS.

959,308.  Specification of Letters Patent.  Patented May 24, 1910.

Application filed January 10, 1908. Serial No. 410,125.

*To all whom it may concern:*

Be it known that I, FRED S. CARR, of Brookline, in the county of Norfolk and State of Massachusetts, have invented certain new and useful Improvements in Attaching Means for Fastening Members, of which the following is a specification.

This invention relates to fastening members which are adapted to be applied to flexible material, such as cloth, thin leather, etc.

The invention is applicable to fastening members of various kinds, such as a socket member adapted to engage a complemental stud member or an eyelet adapted to engage a cord or lacing.

The invention has for its object to provide improved means for clamping a fastening member to a piece of cloth or other flexible material, in such manner that the said flexible material will be firmly engaged at a number of points, and prevented from being pulled outwardly from its proper engagement with the fastening member.

The invention consists in a fastening member having a sheet metal clamping part adapted to bear on one side of the article to which the member is to be attached, and provided with a series of prongs, which are integral with the said clamping part, and project therefrom, and are adapted to penetrate and pass through the portion of the article to which the member is applied, and a complemental part adapted to act as an anvil on the ends of the said prongs to turn or clench the same, and cause their firm engagement with the flexible sheet material.

The invention consists in the improvements which I will now proceed to describe and claim.

Figure 1:
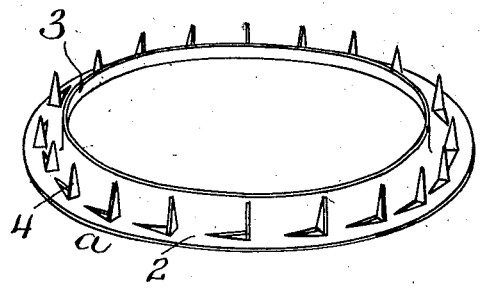
Figure 5:
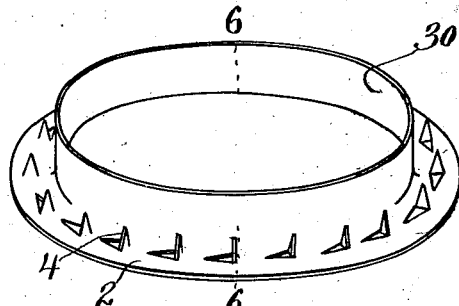
Figure 2:
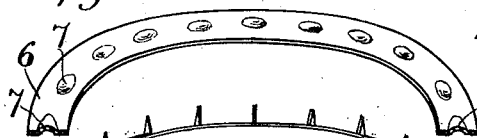
Figure 6:
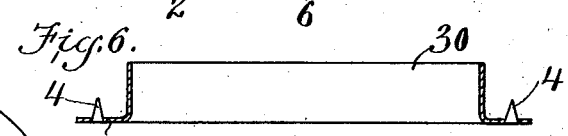
Figure 7:
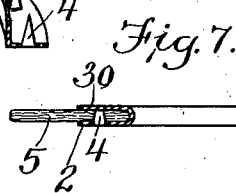
Figure 3:
Figure 4:

Of the accompanying drawings, forming a part of this specification, Figure 1 represents a perspective view of one of the parts of a fastening member embodying my invention. Fig. 2 represents an enlarged perspective sectional view of the part shown in Fig. 1, and a complemental part ready for engagement therewith. Fig. 3 represents a perspective sectional view of the parts shown in Fig. 2, said parts being closed upon each other. Fig. 4 represents a section on line 4—4 of Fig. 3. Fig. 5 represents a perspective view of another form of fastening member embodying my invention. Fig. 6 represents a section on line 6—6 of Fig. 5. Fig. 7 represents a sectional view of the form of fastener shown in Figs. 5 and 6, the fastener being attached to a piece of material.

The same reference characters indicate the same parts in all the figures.

In the drawings *a* represents the main or body portion of a gromet constructed in accordance with my invention, said portion comprising an annular plate 2, the inner edge of which is bent outwardly to form a setting flange 3. 4 4 represent prongs, which are struck up from the portion 2 and entirely within the margin thereof, and are integral therewith, the prongs standing inside the margin of said portion 2 and substantially at right angles with the plane thereof, and being formed to penetrate the sheet of material 5 with which the device is to be engaged. 6 represents a complemental part or member, which has the same general form as the portion 2, and is adapted to surround the flange 3. The part 6 has in its under side a series of recesses 7, coinciding in position with the prongs 4, the said recesses being concave and constituting anvils.

In connecting the parts described, the body portion *a* is placed against one side of the sheet 5, and pressed against the latter until the prongs 4 penetrate the sheet, an opening being formed in the sheet to receive the flange 3. The part 6 is then pressed against the points of the prongs 4, the latter bearing against the recesses 7, pressure being so exerted that the prongs are clenched so that their points turn circumferentially and reënter the sheet 5, in a direction toward the plate 2, as indicated in Fig. 4, owing to the fact that the prongs first stand in planes radial to the plate. The setting flange 3 is then rolled over upon the inner edge of the part 6, as shown in Fig. 3, the parts being thus firmly and securely connected.

In Figs. 5, 6, and 7, I show my invention embodied in a one piece eyelet or gromet, in which the setting flange 30 corresponding to the flange 3 shown in Figs. 1, 2 and 3, is considerably higher in proportion to the spurs 4. When the setting flange is upset or turned over, as shown in Fig. 7, it presses against the points of the spurs, and bends the latter over, and causes them to reënter the material.

My invention is characterized by slender elongated spurs, which are integral with a metallic fastening member, and first penetrate the fabric to which the member is applied, and are then bent back and reënter the fabric, thus passing twice through the fabric, and forming a metallic seam.

Practically the only difference between the two forms shown is that while in Figs. 5, 6 and 7 the outer or anvil portion is integral with the base or body portion, in Figs. 1, 2 and 3 the upper or anvil portion consists mainly of a separate piece which is held in place by rolling the flange 3 over upon the inner edge of the part 6. In each form the prongs are struck up from the base portion 2 and are integral therewith and the bases of the prongs are radial so that when they are clenched down they turn in a circumferential direction. Therefore the entire device can be made with an exceedingly narrow base and anvil portion and yet have no rough portions or tips on the prongs that would be liable to catch upon any fabric coming in contact therewith.

I claim:

A fastening member comprising a circular base or body portion provided with an opening and an upright flange surrounding said opening, said base or body portion being also provided with prongs having radially arranged bases located entirely within the margin of said base or body portion, and an upper or anvil portion against the underside of which the prongs are clenched and turned backward.

In testimony whereof I have affixed my signature, in presence of two witnesses.

FRED S. CARR.

Witnesses:
C. F. BROWN,
PETER W. PEZZETTI.